US005572450A

United States Patent [19]

Worthy

[11] Patent Number: 5,572,450
[45] Date of Patent: Nov. 5, 1996

[54] RF CAR COUNTING SYSTEM AND METHOD THEREFOR

[76] Inventor: David G. Worthy, 819 E. Vaughn, Gilbert, Ariz. 85234

[21] Appl. No.: 471,416
[22] Filed: Jun. 6, 1995
[51] Int. Cl.[6] .............. G01C 25/00
[52] U.S. Cl. .............. 364/571.02; 364/437; 364/438
[58] Field of Search .............. 364/571.02, 565, 364/424.01, 424.06, 436, 437, 438, 439; 346/37; 377/6, 7, 9; 340/905, 907–924, 933–943, 988; 342/69, 104–117; 455/2, 33.1

[56] References Cited

U.S. PATENT DOCUMENTS

| | | | |
|---|---|---|---|
| 2,552,585 | 5/1951 | Rahmel | 250/6 |
| 2,896,070 | 7/1959 | Fremont et al. | 250/2 |
| 3,434,150 | 3/1969 | Wernlund | 346/1 |
| 3,456,192 | 7/1969 | Mixsell et al. | 325/31 |
| 3,614,729 | 10/1971 | Fujimuto et al. | 340/933 |
| 3,626,413 | 12/1971 | Zachmann | 342/104 |
| 4,390,951 | 6/1983 | Marcy | 364/436 |
| 4,916,621 | 4/1990 | Bean et al. | 364/436 |
| 4,985,705 | 1/1991 | Stammler | 342/69 |
| 5,402,117 | 3/1995 | Zijderhand | 340/905 |
| 5,410,724 | 4/1995 | Worthy | 455/2 |
| 5,465,289 | 11/1995 | Kennedy, Jr. | 455/33.1 |

*Primary Examiner*—James P. Trammell
*Attorney, Agent, or Firm*—Meschkow & Gresham

[57] ABSTRACT

A system and method for counting vehicles by detecting RF signals emitted from a portion of the vehicles is provided. An RF scanner/receiver located at a testing site is tuned to receive local oscillator (LO) signals that may be emitted from radio tuners located in a portion of the vehicles. A control unit controls the scanner/receiver, stores data related to the received LO signals, and performs other operating procedures. A central computer in data communication with the control unit performs data translation operations on the raw LO signal data. Scale factors derived from calibration formulas are applied to the system data to provide an estimated vehicle count and an estimated average vehicle speed. The central computer formats the resulting data for presentation to a user.

22 Claims, 4 Drawing Sheets

Fig. 6
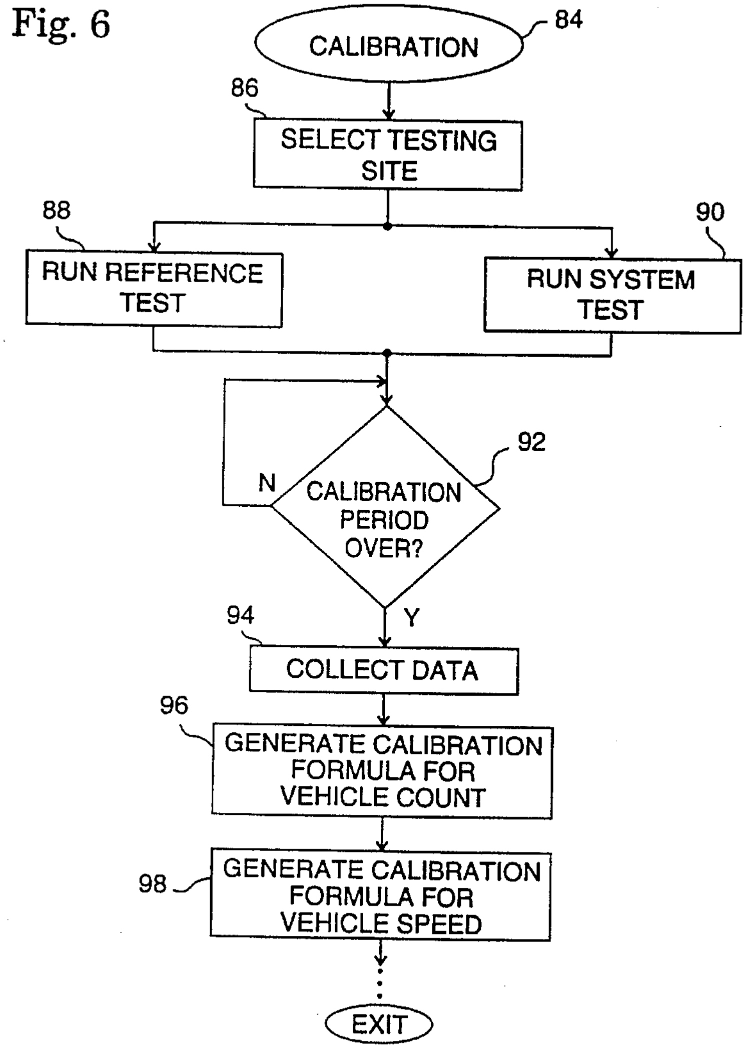
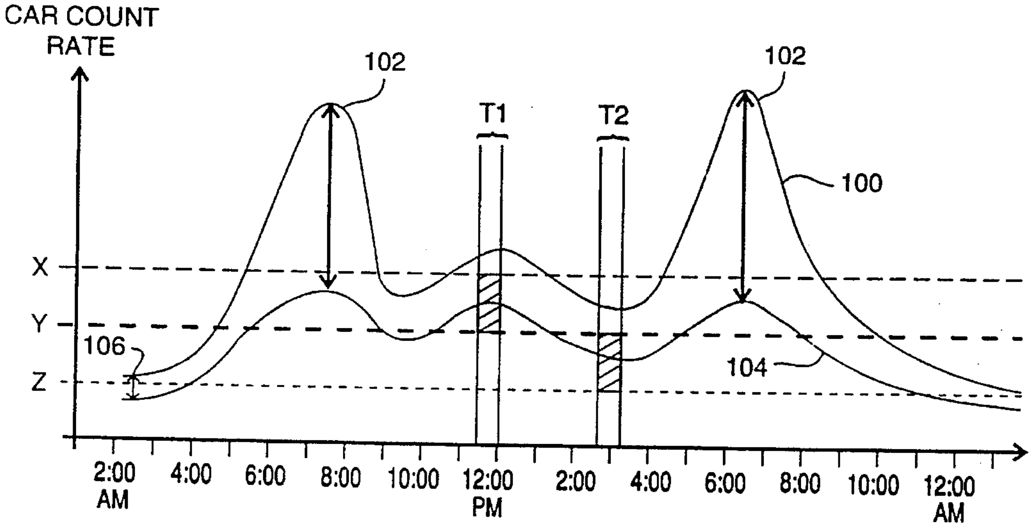
Fig. 7

RF CAR COUNTING SYSTEM AND METHOD THEREFOR

TECHNICAL FIELD OF THE INVENTION

The present invention relates generally to car counting systems. In particular, the present invention relates to methods and apparatus that count vehicles by remotely detecting RF signals emitted by a portion of the vehicles.

BACKGROUND OF THE INVENTION

Automobiles and vehicle traffic are well known aspects of everyday life. Statistics based on traffic patterns, driver demographics, and traffic flow may be valuable to city planners, advertising consultants, billboard companies, or environmental agencies. To meet the demand for such information, different "roadside" systems for counting passing vehicles have been developed. The prior art includes car counting systems that rely upon pressure sensors, acoustic devices, metal detectors, or infrared devices. These and other devices have been used notwithstanding their various drawbacks.

The cost of measurement equipment and the cost of conducting traffic tests may be prohibitively high in many cases. For example, pressure sensitive hoses commonly used to count cars on a short-term basis may cost hundreds of dollars apiece, and they require personnel for installation, maintenance, and removal. In addition, such hoses inherently have a very limited lifespan because they are continually driven over by heavy vehicles. As another example, pressure sensitive plates or inductive sensors may be buried under a road surface to create an effectively permanent measuring device. However, these buried devices can cost thousands of dollars apiece, and the cost of installation (which includes the removal and repaving of a portion of the road) may prohibit their use.

None of the conventional car counting systems are 100% accurate in their measurements. However, many prior art systems are used infrequently and during only a small sample period to gather data that will be relied upon for months or years to come. While such systems may be acceptably accurate during the brief testing period, the actual traffic patterns will inevitably demonstrate long term variations. In addition, if the data gathered during the brief sample period is not representative of ordinary traffic conditions, then any calculations or planning based on the data will be inaccurate. Furthermore, many prior art devices are not designed to constantly and accurately monitor or measure traffic volume for long periods of time. Thus, it is desirable to have a car counting system that has sufficient long-term accuracy, and is capable of operating in a continuous manner.

Some prior art devices may be limited to measuring only one phenomenon, such as a numerical count of the vehicles. In some cases, two similar devices are used in series to gather counting data and speed data. Furthermore, if both traffic directions of a road are to be monitored, then more devices must be utilized. Obviously, when more than one device is used, the cost of gathering data is increased. For this reason, there is a need for a versatile system that can be utilized to measure more than one characteristic of passing vehicles.

SUMMARY OF THE INVENTION

Accordingly, it is an advantage of the present invention that an improved system and method for counting vehicles passing a testing site is provided.

Another advantage of the present invention is that a cost-efficient system for counting cars is provided.

A further advantage is that the present invention provides a durable, noninvasive system for collecting traffic data.

Another advantage is that the present invention requires little human intervention during operation.

The present invention has the further advantage of providing a car counting system that provides useful long-term car count data.

A further advantage of the present invention is that a system and method are provided that can be utilized to measure more than one phenomena associated with a vehicle passing a testing site.

The above and other advantages of the present invention are carried out in one form by a car counting method for estimating the number of vehicles passing a testing site during a time period. The method involves detecting local oscillator signals emitted from vehicles having tuners. A count of the detected local oscillator signals is maintained, and a data translation is performed on the count to estimate the number of vehicles passing the testing site.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 6 is a flow chart of a calibration procedure performed in accordance with the present invention; and FIG. 7 shows a graph of a vehicle flow rate and a corresponding LO signal detection rate during a sample testing period.

DETAILED DESCRIPTION OF THE PREFERRED EMBODIMENT

Figure 1:
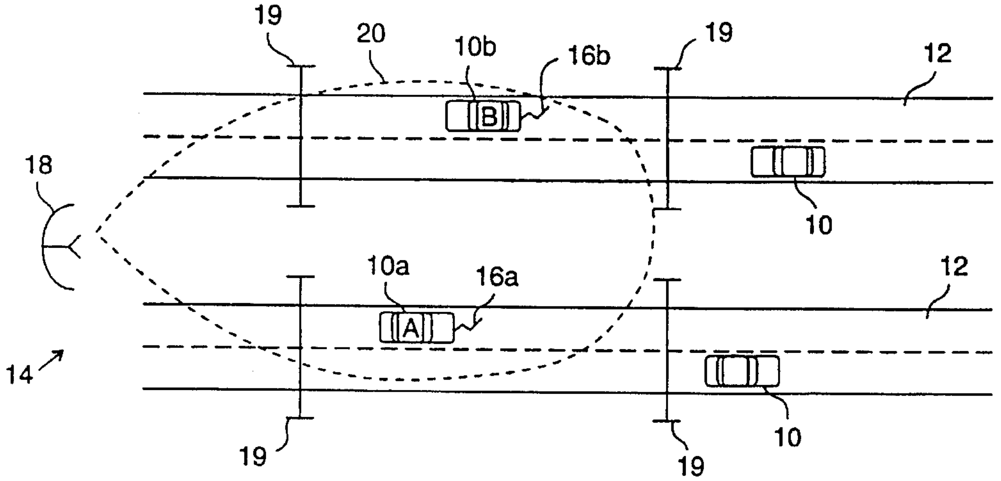
FIG. 1 is a diagram of a typical environment within which the present invention may operate.

FIG. 1 depicts a typical environment within which the preferred embodiment of the present invention may operate. A plurality of vehicles 10 travel on a road 12 in either direction. Many of vehicles 10 may include a radio (not shown) with an integral FM tuner (not shown). Although the preferred embodiment is utilized in connection with FM radio signals, the present invention may also be utilized with AM radio signals or other RF signal sources. Briefly, the present invention estimates the number of vehicles 10 passing a testing site 14 during a testing period by detecting RF emissions from a portion of those vehicles 10 that have FM radios.

FM tuners generate local oscillator (LO) signals for the demodulation of received radio signals. Each transmitted radio frequency has a corresponding LO frequency. A portion of each generated LO signal is emitted (rather weakly) from the tuners through the vehicle antennas. FIG. 1 shows an LO signal 16*a* emitted from vehicle 10*a* and an LO signal 16*b* emitted from vehicle 10*b*. The preferred embodiment utilizes an RF antenna 18 to detect LO signals 16 emitted from the FM tuners. Antenna 18 is desirably a directional antenna that is capable of detecting low level RF signals. A prior patent by the inventor of the present invention discusses one embodiment in which LO signals are detected and analyzed to survey the FM radio listening habits of drivers passing a survey site. The prior patent (U.S. Pat. No. 5,410,724, issued on Apr. 25, 1995) is incorporated by reference herein.

In FIG. 1, an antenna pattern or range 20 corresponds to a threshold signal strength (described below) for which LO signals 16 are detected by antenna 18. Depending upon the antenna configuration and the threshold value, range 20 may vary in size or shape. For example, nothing prevents the present invention from utilizing a smaller range 20 that more or less spans one lane or one side of road 12. Antenna 18 may be located in any suitable location where traffic tends to flow and is less likely to stop. Of course, the present invention is not limited to the layout depicted in FIG. 1.

Figure 2:
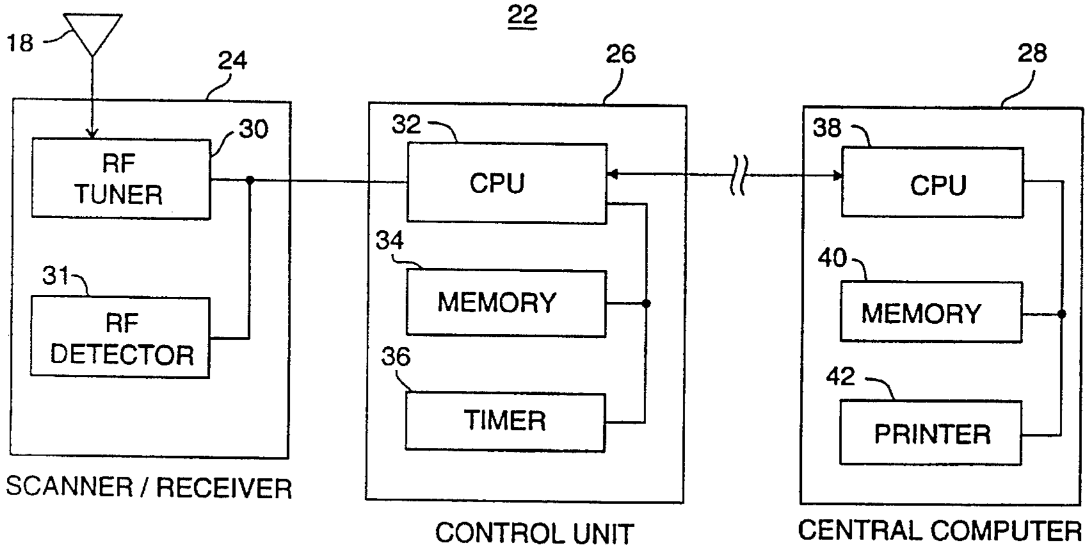
FIG. 2 is a block diagram of a car counting system according to the present invention.

With reference to FIG. 2, a remote car counting system 22 according to the present invention is illustrated in block diagram form. Car counting system 22 generally includes antenna 18 (described above), an RF scanner/receiver 24, a control unit 26, and a central computer 28. Preferably, antenna 18, scanner/receiver 24, and control unit 26 are located at testing site 14 proximate to road 12 (see FIG. 1). In one embodiment of the present invention, antenna 18 is mounted on a roadside pole (not shown) at about a height of at least eight feet.

Scanner/receiver 24 is connected to antenna 18 by conventional RF cables or connectors. Preferably, scanner/receiver 24 and control unit 26 are provided with adequate RF shielding to reduce extraneous noise. Scanner/receiver 24 includes an RF tuner section 30 that continuously scans through the LO frequencies such that antenna 18 preferably receives a limited RF bandwidth for each LO frequency. Scanner/receiver 24 also includes an RF detector 31 for quantifying the signal strength of the detected LO signals. Those skilled in the art should realize that standard operating elements that are not critical to the present invention are not shown in FIG. 2.

Control unit 26 controls the function of scanner/receiver 24, while storing and processing data according to various procedures related to the present invention. Control unit 26 includes a central processing unit (CPU) 32, a memory 34, and a timer 36. CPU 32 is configured to control the scanning operation of RF tuner 30 (described above) and perform other operating processes. CPU 32 is connected to memory 34, which stores relevant data and programming instructions for data manipulation. CPU 32 is also connected to timer 36, which provides time and date information for use with processes described below. According to the preferred embodiment, survey data related to traffic volume, vehicle speed, vehicle direction, and the like, are accumulated at control unit 26 before being downloaded to central computer 28 in a batch format.

Central computer 28 is preferably at a remote location relative to antenna 18. Central computer 28 is in data communication with control unit 26. As indicated by the broken link between control unit 26 and central computer 28, data may be transferred by different methods (e.g., landline telephone modem, cellular modem, physical transfer of floppy disks). According to one aspect of the present invention, central computer 28 can be linked to a plurality of control units 26 corresponding to a plurality of testing sites 14. Thus, central computer 28 may function to monitor traffic at numerous different locations.

Central computer 28 includes at least a CPU 38, a memory 40 and a printer 42. Again, for clarity, ordinary operating components such as a display terminal, modem, or keyboard are not shown in FIG. 2. CPU 38 is configured to perform various operating processes at central computer 28. CPU 38 is connected to memory 40, which stores downloaded data from control unit 26 and programming instructions for central computer 28. CPU 38 is also connected to printer 42 for printing formatted data sheets corresponding to traffic surveys for at least one testing site 14. The printed copy may indicate the time and location of the traffic study, along with survey data describing the vehicle count, direction of travel, and average speed. It should be appreciated that nothing prevents central computer 28 from utilizing any other data presentation device in lieu of, or in combination with, printer 42.

Figure 3:
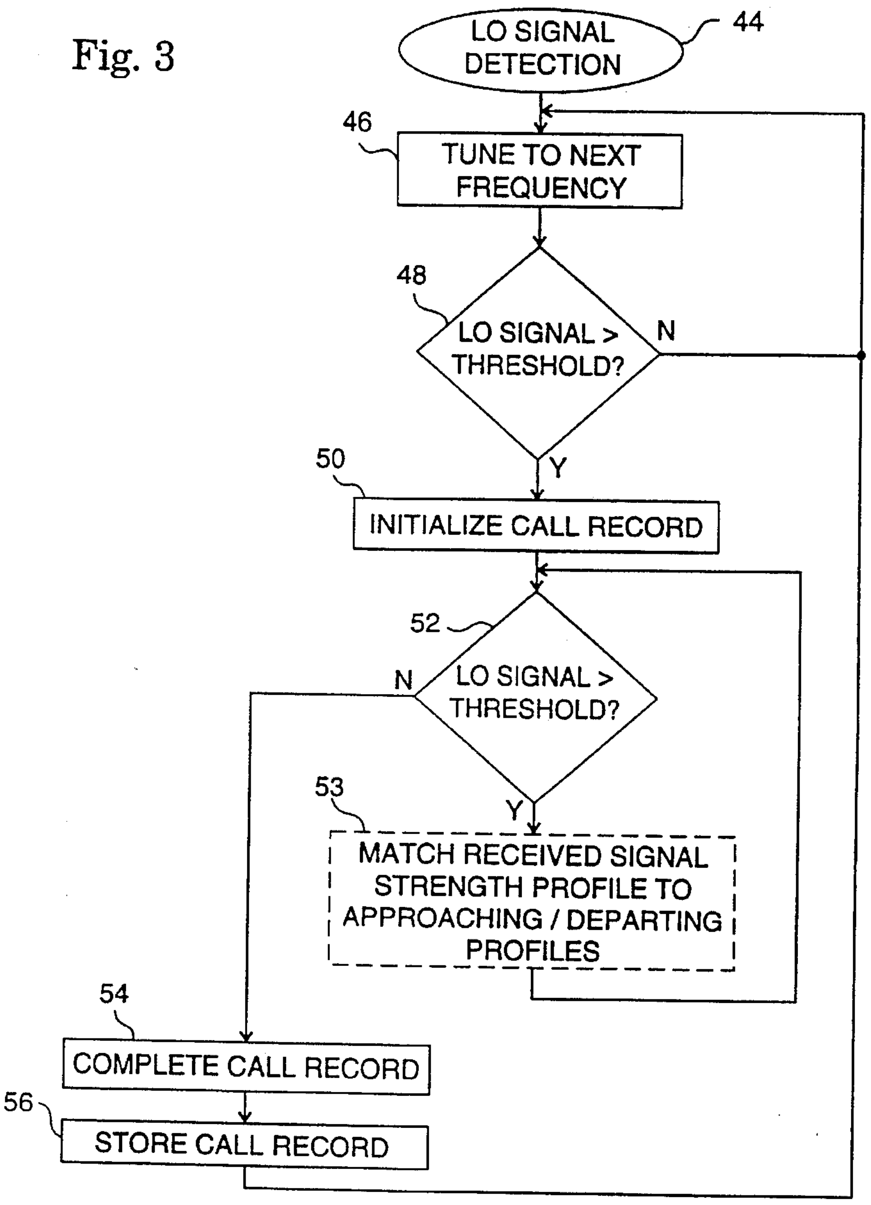
FIG. 3 is a flow chart of a local oscillator (LO) signal detection process performed by the system shown in FIG. 2.

With reference to FIG. 3, an LO signal detection process 44 carried out by control unit 26 is depicted as a flow diagram. Process 44 controls scanner/receiver 24, and performs preliminary data manipulation. Process 44 begins with a task 46, which tunes RF tuner 30 to an LO frequency for detection. As described above, LO signals 16 have known frequencies related to the demodulation of distinct radio station transmitting frequencies. Currently, LO signals 16 are generated in even tenth-MHz frequencies in an LO range of 98.8 MHz to 118.6 MHz. Thus, process 44 steps through various ones of the LO frequencies such that antenna 18 "searches" for those distinct frequencies. Of course, some margin of frequency error is inherent, and task 46 may desirably tune RF tuner 30 to a narrow bandwidth surrounding the particular LO frequency.

Following task 46, a query task 48 determines whether scanner/receiver 24 has received LO signal 16 having a signal strength greater than a predetermined threshold. A threshold value is desirably set to reduce the occurrence of erroneous detection, or to reduce the effect of RF noise. If query task 48 does not detect LO signal 16 above the threshold, then task 46 is reentered to tune RF tuner 30 to another LO frequency. If query task 48 determines that an acceptable LO signal 16 is present, then a task 50 is initiated.

Task 50 initializes a call record that contains data related to the received LO signal 16. The call record may include data such as the date, the test location, the detected LO frequency, the average signal strength, and a time stamp. Following task 50, a query task 52 tests whether LO signal 16 is still above the threshold strength. If query task 52 determines that LO signal 16 is above the threshold strength, then an optional task 53 may be performed.

In addition to estimating the number and speed of the vehicles passing testing site 14, car counting system 22 may also be configured to ascertain the direction of travel of vehicles 10 when LO signals 16 are detected. If this feature is desired, then task 53 matches the profile of the received signal strength to an signal strength profile for either an approaching or a departing vehicle 10. The received signal strength may be measured and quantified by detector 31 (see FIG. 2). Task 53 determines the direction of travel of vehicle 10 associated with a particular call record by analyzing the detected signal strength characteristic of LO signal 16.

Figure 3A:
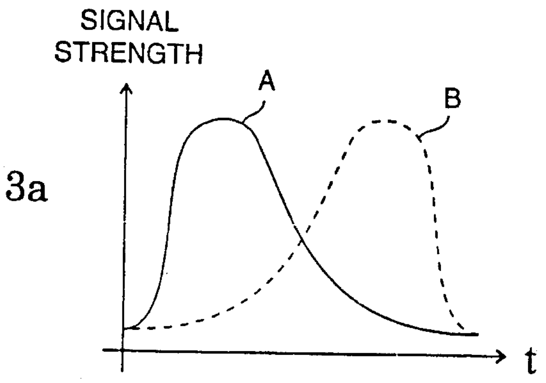
FIG. 3*a* is a graphic depiction of alternate signal strength profiles evaluated in the LO signal detection process of FIG. 3.

With additional reference to FIGS. 1 and 3*a*, task 53 will be described in detail. FIG. 1 depicts vehicle 10*a* travelling away from antenna 18 and vehicle 10*b* approaching antenna 18. Due to the preferred directional nature of antenna 18, the detected signal strengths of vehicle 10*a* and vehicle 10*b* will be characterized by the respective curves A and B shown in FIG. 3*a*. Thus, the signal strength for vehicle 10*b* approaching testing site 14 has a relatively gradual increase followed by a relatively sudden decrease, while the signal strength for vehicle 10*a* leaving testing site 14 has a relatively sudden increase followed by a relatively gradual decrease. Task 53 ascertains the direction of travel for a given vehicle 10 by analyzing the increase/decrease characteristic of the LO signal strength.

Following task 53, query task 52 is repeated until the detected LO signal 16 falls below the threshold value. When this occurs, a task 54 completes the call record by, for example, adding a final time stamp. In addition, the call record may include data related to the direction of travel of vehicle 10.

After task 54, a task 56 stores the completed call record in memory 34 (see FIG. 3) before reentering process 44 at task 46. Thus, process 44 operates to continuously cycle through the various LO frequencies. Control unit 26 may be programmed with the specific LO frequencies corresponding to the local radio stations, or programmed to bypass certain frequencies that are exceptionally noisy or rarely listened to. The individual call records may be accumulated at control unit 26 for further processing or downloading to central computer 28.

Figure 4:
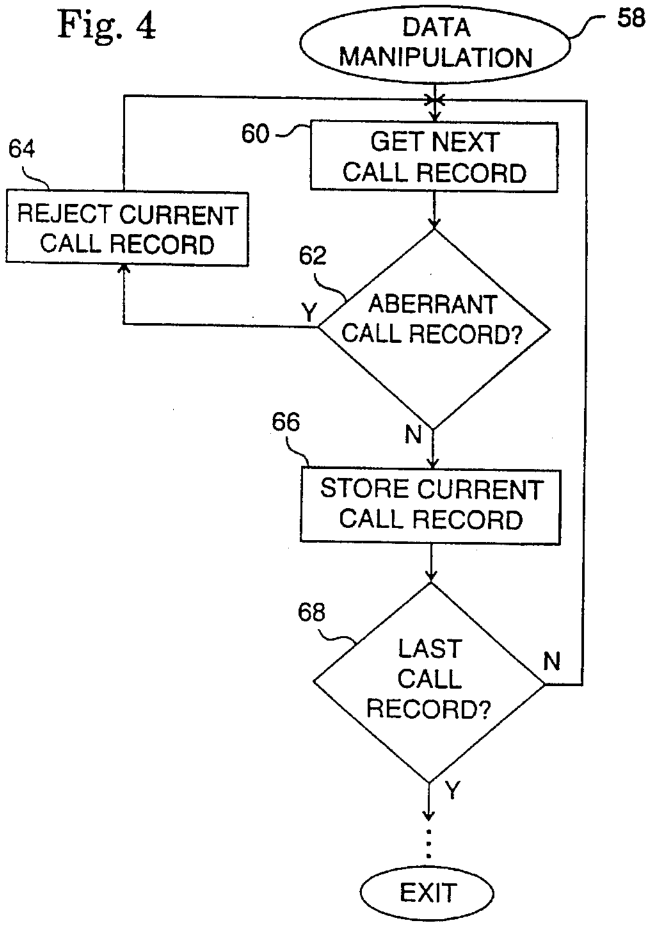
FIG. 4 is a flow chart of a data manipulation process performed by the system shown in FIG. 2.

FIG. 4 shows a flow diagram of a data manipulation process 58 performed by central computer 28. Although process 58 is preferably performed by central computer 28, nothing prevents the present invention from performing process 58, or portions thereof, at control unit 26 prior to downloading to central computer 28. In addition, process 58 may manage hundreds or thousands of call records collected from any number of testing sites 14.

Process 58 begins with a task 60, which obtains the next call record for processing. As described above, each call record preferably contains information related to the detected LO signal 16. Following task 60, a query task 62 tests the call record to determine whether it includes any aberrant data. Aberrant data may be caused by various uncontrolled factors such as RF interference, traffic congestion, or environmental conditions. Query task 62 may compare the data contained in the call record to historical data for the particular testing site 14. For example, if a particular call record includes a detected LO signal 16 having an unusually long duration, i.e., much longer than a typical call duration of a few seconds, then query task 62 will determine that the call record is aberrant. If query task 62 determines that a call record is aberrant, then process 58 proceeds to a task 64. Task 64 rejects the aberrant call record before reentering task 60, which retrieves the next call record. The rejection of abnormal data increases the long-term accuracy of car counting system 22.

If query task 62 determines that the call record is not aberrant in comparison to historical records, then process 58 proceeds to a task 66, which stores the current call record in memory 40. Following task 66, a query task 68 determines whether the current call record is the last call record for the particular testing period. If more call records are available, then query task 68 reenters task 60 to get the next call record. If query task 68 determines that the current call record is the last one, then process 58 exits. Those skilled in the art will appreciate that process 58 may occur during other control processes, or as a subprocess of a larger procedure.

Figure 5:
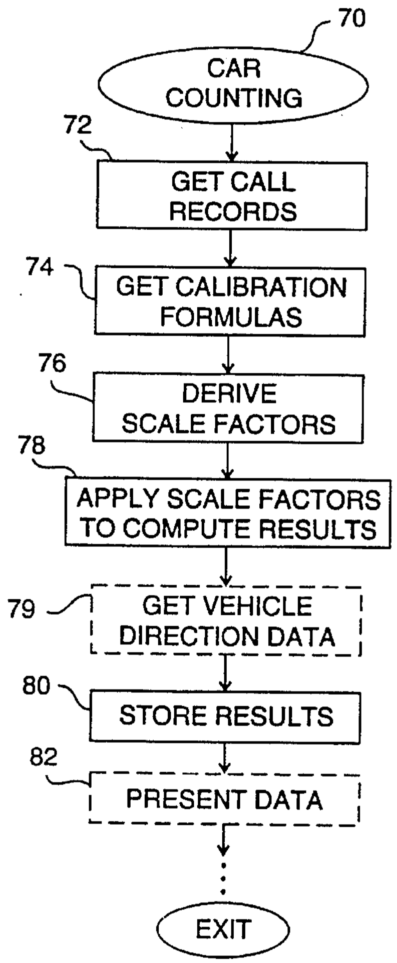
FIG. 5 is a flow chart of a car count process performed by the system shown in FIG. 2.

Referring now to FIG. 5, a car counting process 70 is depicted as a flow diagram. Car counting process 70 is utilized by the preferred embodiment to estimate the number of vehicles passing testing site 14. "Car counting" for purposes of the present invention is a general phrase whose meaning encompasses the accumulation of any data typically related to vehicle traffic. Those skilled in the art will appreciate that any vehicle may be considered a "car" and that data in addition to mere numbers of vehicles are within the meaning of a "car count." For example, in addition to actually counting the number of passing vehicles 10, process 70 may estimate the average speed of vehicles 10 travelling past testing site 14 and other traffic-related information.

Car counting process 70 begins with a task 72, which retrieves the call records stored by data manipulation process 58. Following task 72, a task 74 retrieves calibration formulas from memory 40. The calibration formulas (described in more detail below) relate the data contained in the sample call records to the number of and speed of the population of vehicles 10 passing testing site 14 during the testing period. After task 74, a task 76 derives scale factors from the calibration formulas, which are applied to the data contained in the call records in a subsequent task 78. Task 78 may be generally referred to as a data translation operation. During task 78, the desired results (number of vehicles, traffic flow rate, average vehicle speed) are computed by central computer 28. According to one aspect of the preferred embodiment, the scale factors derived from the calibration formulas are multipliers. Following task 78, an optional task 79 may be performed if vehicle direction information is desired.

Task 79 retrieves the vehicle direction data from the individual call records. As described above in relation to LO signal detection process 44 (see FIG. 3), the call records may contain data derived from the detected signal strength profiles of LO signals 16. Following task 79, a task 80 stores the computed results (and optional vehicle direction data) in memory 40. If desired, an optional task 82 may be performed to present data to an operator. Of course, the results may also be compiled and formatted for storage on a computer memory disk or display on a computer terminal (not shown). Following task 82, car counting process 70 exits. Process 70, as indicated by the ellipses, may be performed along with other processes described herein, or may include other tasks necessary for specific applications.

With reference now to FIG. 6, a calibration procedure 84 is illustrated as a flow diagram. Calibration procedure 84 is performed to obtain the calibration formulas and corresponding scale factors required in tasks 74, 76, and 78 of car counting process 70. Calibration procedure 84 starts with a task 86, which involves the selection of testing site 14 (see FIG. 1). The calibration formulas may be location dependent due to variables such as radio listening habits, driving habits, and traffic flow capacity. As such, it is desirable to perform calibration procedure 84 at least once for each testing site 14. After task 86, calibration procedure 84 performs a task 88 and a task 90 (preferably simultaneously).

Task 88 involves running a reference car counting test, while task 90 involves running a car counting test according to the preferred embodiment to obtain raw data associated with LO signal detection. In other words, task 90 only produces sample LO signal data uncorrelated to vehicle population data. With brief reference again to FIG. 1, task 88 may utilize any conventional car counting device having acceptable accuracy. The results of task 88 are preferably independent of emitted LO signals 16. For example, the reference test conducted in task 88 may include a plurality of pressure-sensitive hoses 19 extending across road 12. Hoses 19 are preferably used to record data such as the car count, the current time, and the time of travel between each of hoses 19.

In accordance with a query task 92, a determination is made concerning whether the calibration period has ended. The calibration period may be preprogrammed or terminated by a system operator at will. If query task 92 determines that the calibration period has ended, then a task 94 collects the data generated by task 88 (reference data) and task 90 (system data). Following task 94, a task 96 generates a calibration formula for vehicle counting. Following task 96, a task 98 generates a calibration formula for vehicle speed estimation. The calibration formulas (described in more detail below) are generated such that the reference data can be estimated by applying scaling factors to the system data. Those skilled in the art should appreciate that calibration formulas for other measurements may also be generated during calibration procedure 84, and that the present invention is not limited to the estimation of the number or average speed of vehicles 10 passing testing site 14.

Following task 98, calibration procedure 84 ends. According to a preferred aspect of the present invention, calibration procedure 84 need only be repeated until acceptable calibration formulas are obtained. As such, the reference test equipment, such as hoses 19, need not remain at testing site 14 after an adequate calibration. Of course, calibration procedure 84 may be periodically repeated to verify or modify the calibration formulas. By utilizing statistical averaging along with the calibration formulas, the present invention can accurately estimate the vehicle count over an extended and continuous period of time. According to a preferred aspect of the present invention, the duration of the testing period is at least one month, and calibration procedure 84 need not be repeated during that time.

FIG. 7 is an exemplary graph of the rate of vehicles 10 passing testing site 14 during a testing period between 2:00 AM and 12:00 AM, along with a corresponding LO detection rate. FIG. 7 is merely indicative of the type of traffic data typically associated with the present invention, and actual traffic patterns for any given testing site 14 may vary. As shown, an actual rate curve 100 corresponds to the actual number of vehicles passing testing site 14 (as measured by the reference test equipment during task 88 described above). During a typical workday, actual rate curve 100 has a plurality of peaks 102 that occur during morning and afternoon rush hours. Actual rate curve 100 otherwise fluctuates during the day and reduces during late night and early morning hours.

During task 90 of calibration procedure 84 (see FIG. 6), an LO rate curve 104, corresponding to raw LO data, is generated by system 22. LO rate curve 104 only counts a portion of vehicles 10 passing testing site 14 because system 22 conducts a statistical survey rather than a census. Due to inherent operating characteristics of system 22, the difference between actual rate curve 100 and LO rate curve 104 may vary according to the rate of traffic. For example, during peaks 102, system 22 may detect a proportionately smaller amount of vehicles 10 than during an early morning time period 106. Consequently, the calibration formula will produce varying scale factors that depend upon the current LO rate.

The long-term empirical results for one embodiment of the present invention reveal that approximately ten percent of the total vehicle population is detected during a testing period. This percentage is merely an example of the statistical relationship between the actual vehicle population and the detected LO count for one car counting system 22. The actual results may vary for each testing site 14, and may be affected by factors such as radio listening trends, traffic congestion, and the number of vehicles having FM tuners.

As described previously, the scale factors derived from the calibration formulas are applied to the data contained in the call records. For example, as shown in FIG. 7, if the detected LO rate falls between a value X and a value Y for a predetermined time period T1, then a first scale factor may be applied to LO rate curve 104 for time period T1. Similarly, a second scale factor may be applied during time period T2, when the detected LO rate falls between value Y and a value Z. In the preferred embodiment, the sampled time period and the different LO rate thresholds may be chosen to yield acceptable approximations.

A similar calibration curve and scale factor derivation scheme may be utilized by car counting system 22 to estimate the average speed of vehicles 10 passing testing site 14. With brief reference again to FIG. 1, a conventional method for measuring the average speed of vehicles 10 involves spacing hoses 19 a predetermined distance apart. Hoses 19 are used to detect the time required for vehicles 10 to travel the predetermined distance, which is used to calculate the speed of vehicles 10. Of course, any other conventional speed determination procedure may be utilized as a reference during task 88. Calibration procedure 84 generates a formula that correlates the reference speed data to the duration of the call records produced in LO signal detection process 44 (see FIG. 3). Generally, the length of an individual call record (in units of time) is inversely proportional to the speed of vehicle 10 (in units of distance/time).

In summary, the present invention provides an improved system and method for counting vehicles passing a testing site. A system according to the present invention is economical because it is durable, it doesn't require excessive human intervention, and it doesn't require the modification of the road surface. In addition, the car counting system of the present invention achieves long-term accuracy. Furthermore, the present invention also can be utilized to measure more than one phenomena associated with a vehicle passing a testing site. Still further, the present invention may be used in connection with traffic density studies.

The above description is of a preferred embodiment of the present invention, and the invention is not limited to the specific embodiment described and illustrated. For example, the specific hardware implementation of the described embodiment may be varied to achieve equivalent results. In addition, some of the specific tasks of the operating processes described herein need not be performed in any particular order, and the individual procedures are not restricted to particular operating components. Furthermore, many variations and modifications will be evident to those skilled in this art, and such variations and modifications are intended to be included within the spirit and scope of the invention, as expressed in the following claims.

What is claimed is:

1. A car counting method, based upon survey data, for estimating the number of vehicles passing a testing site during a testing period, said method comprising the steps of:

detecting local oscillator (LO) signals emitted from a portion of said vehicles, said portion of vehicles having tuners located therein;

maintaining an LO count of said detected LO signals; and performing a data translation operation on said LO count to estimate the number of said vehicles passing said testing site during said testing period.

2. A method according to claim 1, wherein said detecting step comprises scanning through a plurality of even tenth-MHz frequencies in an LO range of 98.8 MHz to 118.6 MHz.

3. A method according to claim 1, further comprising the step of generating a calibration formula that relates said LO count to the number of vehicles passing said testing site during said testing period, wherein:

said generating step occurs before said performing step; and said performing step comprises applying a scale factor to said LO count, said scale factor being derived from said calibration formula.

4. A method according to claim 3, wherein said generating step occurs during a calibration period and comprises the steps of:

keeping a vehicle count of the number of vehicles passing said testing site, said vehicle count being independent of emitted LO signals;

detecting a plurality of LO signals emitted from a portion of a plurality of vehicles having tuners located therein;

maintaining an LO count of said detected LO signals; and deriving said calibration formula such that said vehicle count is approximated by applying said calibration formula to said LO count.

5. A method according to claim 3, wherein said scale factor varies in response to said LO count.

6. A method according to claim 3, wherein said scale factor varies in response to the location of said testing site.

7. A method according to claim 3, wherein:

said generating step is performed prior to said testing period; and said detecting, maintaining, and performing steps are performed substantially continuously during said testing period.

8. A method according to claim 7, wherein the duration of said testing period is at least one month.

9. A method according to claim 7, wherein said generating step is repeated after said first testing period for the verification or the modification of said calibration formula.

10. A method according to claim 1, wherein:

said method further comprises the step of providing a directional radio frequency antenna at said testing site for detecting said LO signals;

each of said detected LO signals has a corresponding signal strength detected by said antenna; and said method further comprises the step of ascertaining the direction of travel of said vehicles in response to said signal strengths of said detected LO signals.

11. A method according to claim 10, wherein:

said signal strength for a vehicle approaching said testing site has a relatively gradual increase followed by a relatively sudden decrease;

said signal strength for a vehicle leaving said testing site has a relatively sudden increase followed by a relatively gradual decrease; and the directions of travel for said vehicles are ascertained in response to the increase/decrease characteristics of said signal strengths.

12. A remote car counting method for collecting survey data related to a population of vehicles passing a testing site during a testing period, said method comprising the steps of:

providing a radio frequency antenna to detect a plurality of local oscillator (LO) signals emitted from a portion of said population of vehicles;

receiving said detected LO signals at a receiver;

producing a plurality of call records that contain data related to said received LO signals; and performing a translation operation on said data to estimate the number and approximate speed of said vehicles passing said testing site during said testing period.

13. A method according to claim 12, wherein said call records contain data that identify a duration for which each of said LO signals is detected.

14. A method according to claim 13, wherein:

each of said detected LO signals has a corresponding signal strength detected by said antenna;

said duration is the time during which said detected LO signals are above a predetermined threshold signal strength; and said performing step relates the approximate speed of said vehicles to said duration.

15. A method according to claim 12, wherein:

said method further comprises the step of generating a first calibration formula that relates said data to the number of said vehicles passing said testing site during said testing period, and a second calibration formula that relates said data to the approximate speed of said vehicles passing said testing site during said testing period;

said generating step occurs before said performing step; and said performing step comprises the application of a first scale factor and a second scale factor derived from said first and second calibration formulas, respectively, to said data.

16. A method according to claim 12, wherein said producing step comprises:

counting a first portion of said call records that are substantially similar to a set of historical call records for said testing site; and rejecting a second portion of said call records that are aberrant in comparison to said set of historical call records.

17. A method according to claim 16, wherein said call records are accumulated prior to downloading to a central computer in a batch format.

18. A remote car counting system for estimating, based upon survey data, the number of vehicles passing a testing site during a testing period, said system comprising:

a radio frequency antenna;

a receiver coupled to said antenna, said receiver being configured in cooperation with said antenna to detect a plurality of local oscillator (LO) signals emitted from a portion of a plurality of vehicles having tuners located therein;

means for producing a plurality of call records containing data related to said detected LO signals, said means for producing being in data communication with said receiver; and means for performing a translation operation on said data to estimate the number of said vehicles travelling past said testing site during said testing period, said means for performing being in data communication with said means for producing.

19. A system according to claim 18, further comprising a central computer in data communication with said means for producing, wherein said central computer receives said call records downloaded from said means for producing and controls a data presentation device to present data corresponding to a traffic survey for said testing site.

20. A system according to claim 19, wherein said central computer comprises means for selecting said call records such that said call records having substantially similar characteristics to a set of historical call records for said testing site are selected while said call records having aberrant characteristics are rejected.

21. A system according to claim 18, wherein:

each of said detected LO signals has a corresponding signal strength detected by said antenna;

said signal strength for a vehicle approaching said testing site has a relatively gradual increase followed by a relatively sudden decrease;

said signal strength for a vehicle leaving said testing site has a relatively sudden increase followed by a relatively gradual decrease; and said system further includes means for ascertaining the direction of travel of said vehicles in response to the increase/decrease characteristics of said signal strengths.

22. A system according to claim 18, wherein each of said detected LO signals has a corresponding signal strength detected by said antenna, and said system further comprises:

a timer configured to record a duration during which said detected LO signals are above a predetermined signal strength; and means for performing a data translation operation on said recorded duration to estimate the speed of said vehicles travelling past said testing site.

* * * * *